United States Patent [19]

Kemeny

[11] Patent Number: 4,598,332

[45] Date of Patent: Jul. 1, 1986

[54] CURRENT LIMITING APPARATUS UTILIZING MULTIPLE RESISTIVE PARALLEL RAILS

[75] Inventor: George A. Kemeny, Wilkins Township, Allegheny County, Pa.

[73] Assignee: Westinghouse Electric Corp., Pittsburgh, Pa.

[21] Appl. No.: 632,975

[22] Filed: Jul. 20, 1984

[51] Int. Cl.[4] .......................... H02H 9/02; H02H 9/08

[52] U.S. Cl. ........................................ 361/58; 338/13; 338/20; 338/176

[58] Field of Search ................. 361/58; 338/32 H, 13, 338/32 R, 20, 116, 118, 125, 160, 176, 177

[56] References Cited

U.S. PATENT DOCUMENTS 4,347,463 8/1982 Kemeny et al. ..................... 318/135

4,433,608 2/1984 Deis et al. ................................ 89/8

*Primary Examiner*—A. D. Pellinen

*Assistant Examiner*—H. L. Williams

*Attorney, Agent, or Firm*—R. P. Lenart

[57] ABSTRACT

A current limiting apparatus includes at least two pairs of generally parallel conductive rails each having an initial high conductivity portion and a more resistive portion. A sliding armature conductor is positioned between each pair of rails and makes sliding electrical contact with the rails such that a high fault current flowing through the rails and the associated armature conductor produces forces which propel the armature conductor along the rails thereby increasing the resistance through which current flows. The pairs of rails are geometrically associated such that current flowing in each pair of rails augments the accelerating force on the armature conductor located between the other pair of rails. Additional accelerating force augmenting may be provided by a multiple turn coil located near the high conductivity portions of the rails.

33 Claims, 6 Drawing Figures

CURRENT LIMITING APPARATUS UTILIZING MULTIPLE RESISTIVE PARALLEL RAILS

BACKGROUND OF THE INVENTION

This invention relates to electrical power system protection devices and more particularly to apparatus which limits circuit current during fault conditions.

The interruption of fault currents in a high powered electrical system is a technically difficult task when fault currents can rise to hundreds of kiloamps. One common means of current interruption utilizes a massive circuit breaker to create arc voltage between separating contacts which finally exceeds the system voltage. These breakers are subject to severe breaker arc contact erosion due to long duration, high current arcing during which inductive energy of the power system is dissipated in the arc. This contact erosion by arcing can be decreased by using a secondary breaker which initially commutates the fault current into a low inductance shunt resistor thereby beating the resistor to increase its resistance and limit current. Final interruption of this reduced current is then accomplished by a primary breaker. This scheme, which is used in direct current subway and people mover systems, entails less contact damage but requires two series connected circuit breakers.

Another current interruption scheme uses the series connection of a current limiting fuse and a standard circuit breaker. In that configuration, the fuse acts to limit current and open the circuit under massive fault current conditions. For more moderate fault currents the fuse remains intact and the circuit breaker alone performs the interruption function. Another current limiting scheme which is suitable for smaller and generally compact electrical systems involves the dropping of generator field excitation when a fault is sensed. However, instead of simply isolating the fault, the entire generating system is necessarily disabled. In addition, the response time of the generator field control is slow and dangerously high fault currents may be unavoidable.

A copending application entitled "Current Limitation Devices Utilizing Resistive Parallel Rails" by Kemeny and Fox, which is assigned to the same assignee and filed on the same date as the present application, discloses a self resetting, current limiting system wherein a sliding conductive armature shorts across parallel high conductivity rails at steady state conditions. When a predetermined threshold current is exceeded during a massive system fault condition, the armature conductor is electromagnetically accelerated into a resistive rail bore thus rapidly inserting series resistance to provide the current limiting function, which is obtained without arcing or current commutation. Actual circuit opening is performed by a breaker or contractor. The disclosure of this copending, commonly assigned application is hereby incorporated by reference.

SUMMARY OF THE INVENTION

A current limiting apparatus constructed in accordance with the present invention comprises a first pair of conductive rails; a first propellable armature conductor slidably disposed between the first pair of conductive rails; a second pair of conductive rails; a second propellable armature conductor slidably disposed between the second pair of conductive rails; means for electrically connecting the first and second pairs of rails in series or parallel with each other wherein current flow in each pair of conductive rails augments the accelerating force on the propellable armature conductor between the other pair of rails; and means for connecting the series or parallel connection of rails to an external circuit such that under fault conditions, each armature conductor is electromagnetically propelled by the fault current into a bore lined by a resistive portion of at least one of the rails, thereby adding circuit impedance to limit the fault current magnitude. The accelerating force augmenting function may be achieved by utilizing a favorable rail geometry such as where all four rails lie geometrically parallel to each other.

In an alternative embodiment, the pairs of rails can be axially aligned and a multiple turn augmenting structure can be positioned near adjacent ends of the pairs of rails to augment the magnetic flux density over the initial armature acceleration length. In this configuration, the armature conductors are accelerated in opposite directions.

DESCRIPTION OF THE PREFERRED EMBODIMENT

Figure 1:
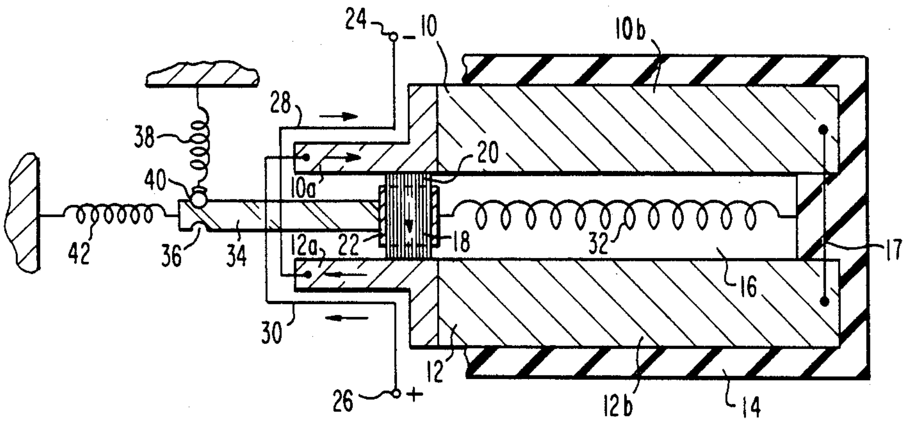
FIG. 1 is a partial longitudinal cross section of a modular current limiting device for use in accordance with one embodiment of the present invention.

Referring to the drawings, FIG. 1 is a partial longitudinal cross section of a modular current limiting device for use in one embodiment of this invention. The current limiter includes a pair of generally parallel conductive rails 10 and 12. Rail 10 includes a first section **10*a* having a first resistance per unit length and a second section 10*b* having a higher resistance per unit length. Similarly, conductive rail 12 includes a first section 12*a* having a first resistance per unit length and a second section 12*b* having a higher resistance per unit length. The first section of each rail has a relatively high conductivity, while the second section of each rail is made of a more resistive material. These conductive rails are restrained in an insulating support structure 14 such that a bore 16 is formed between the rails. An armature assembly 18 is positioned between the rails and may include a plurality of conductive fibers 20 and a conductive band 22 which supports the fibers. The conductive fibers make sliding electrical contact between the rails and are initially positioned between the high conductivity rail sections 10*a* and 12*a***.

Terminals 24 and 26 are provided for connecting the current limiter to an external electrical circuit. These terminals are connected to the conductive rails by way of conductors 28 and 30 respectively. Conductors 28 and 30 are shown to be positioned such that current flow, as indicated by the arrows, in at least a portion of each conductor 28 and 30 is in the same direction as current flow in the adjacent portion of the high conductivity rail sections 10*a* and 12*a*. This augments the magnetic flux density behind the armature assembly 18 to increase the initial armature conductor accelerating force. In operation, a fault current delivered to the rails through terminals 24 and 26 passes through rail sections 10*a* and 12*a* and the armature conductor and produces an electromagnetic force which accelerates the armature conductor into the portion of bore 16 which is lined by resistive rail segments 10*b* and 12*b*. As the armature conductor passes through bore 16 the length of resistive rail segments 10*b* and 12*b* which are in the circuit increases, thereby increasing the series resistance of the current limiter and decreasing the fault current.

A means for limiting the velocity and distance traveled by the armature conductor is provided in the form of a spring 32. Once current has been successfully interrupted, spring 32 provides a self resetting function by returning the sliding armature assembly 18 to its initial normal position. A resilient mechanical stop 34 can be used to prevent excessive armature movement to the left and may incorporate means to safely slow down the armature when it is returned to its starting or steady state conduction position by the return spring. By making the initial armature conductor position adjustable, for example by abutting the resilient stop 34 against an insulating screw, not shown, one can produce a current limiting device with a threshold current which is variable over a given range of current values. If a greater range of threshold current values is desired, then it may be preferable to have a clutch mechanism which releases the sliding armature at a preset and adjustable force. As shown in FIG. 1, the resilient stop 34 may be provided with a peripheral ball groove 36. A spring 38 can then be used to adjust the pressure on a ball 40 which fits in groove 36 to give a wide range of release forces and hence threshold currents.

If the sliding armature in its initial position is primarily restrained by a clutch mechanism, rather than by static friction plus the return spring force, then a spring 42 may be used to assist initial slider acceleration. For example, the slider motion during a return to the starting position could be arrested by the spring 42 which is thereby compressed and remains compressed since the armature is restrained or caught by the clutch mechanism. During a subsequent fault current condition, as soon as the force produced by the threshold current exceeds the clutch setting, the slider is released and its acceleration for the first few centimeters is then augmented by the spring force which can act, for example, on one end of the ball groove equipped resilient stop 34.

The initial threshold current level can also be controlled by varying the initial armature conductor position. In a far forward position, some of the armature fiber contacts may be within the resistive bore section at steady state conditions. This will result in less brush area for rated current conduction in the highly conductive rail portion but may be acceptable in a conservatively designed system since there will be essentially no current conduction through the resistive rails because of the negligible voltage difference across the fibers which connect the highly conductive rail sections.

Conductors 28 and 30 have been arranged adjacent to the highly conductive sections of the rails to increase the flux density per unit current behind the armature conductor. This configuration can be viewed as a multiple turn coil. Since the accelerating force on the armature is equal to the vector cross product of the current density and the magnetic flux density, JxB, any increase in flux density will increase the initial armature accelerating force. A configuration of the FIG. 1 type geometry can be expected to have an augmentation factor of about 4 and higher augmentation factors are attainable by adding more flux augmenting turns. As more massive armature conductors are required to conduct higher steady state currents, more augmenting turns can be added. Alternatively, the highly conductive rail sections may be provided with cooling means at the initial normal armature conductor location so that a light armature can conduct a higher current without overheating. Smaller mass armatures will experience higher acceleration for a given accelerating force. Of course higher augmentation factors and improved cooling options can be used in combination for very high current ratings.

As shown in FIG. 1, the resistive rail portions 10*b* and 12*b* may be suitably electrically shorted to each other at their ends as shown by connection 17. In this case, as the propellable armature conductor approaches its extreme location during a current limiting operation, most of the current will flow through connection 17 rather than through the armature conductor. This will beneficially reduce the additional temperature rise in the armature conductor and will also reduce the accelerating force in the area where armature conductor motion must be arrested.

Figure 2:
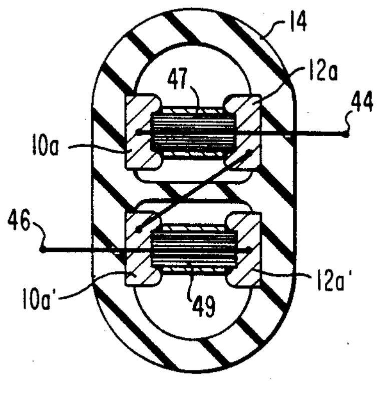
FIG. 2 is a transverse cross section of a current limiter in accordance with this invention.
Figure 3:
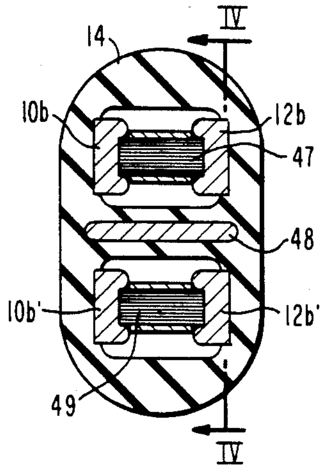
FIG. 3 is a transverse cross section of an alternative embodiment of this invention.

The modular current limiter of FIG. 1 may be suitable for use in a system having, for example a five kilovolt peak voltage. For higher system voltages, these modular units may be connected in series. Through the use of favorable geometries, the magnetic fluxes of the series connected modular limiters can interact with each other so that in cooperation, advantages are attained beyond those attained by simply using two essentially independent units in series. FIG. 2 is a transverse cross section of a current limiting apparatus constructed in accordance with one embodiment of this invention. This apparatus includes two of the modular current limiters shown in FIG. 1. A first pair of high conductivity rail sections 10*a* and 12*a* are shwon to be closely stacked above a second pair of high conductivity rail sections 10*a'* and 12*a'*. These rail sections are shown electrically connected in series with each other and this series combination is connected to a pair of terminals 44 and 46 for connection to an external electric circuit. In this configuration, the magnetic fluxes produced by current flowing through the rail sections will favorably interact and result in very roughly doubling of the accelerating force on each of the two mechanically independent armature conductors 47 and 49. By crossing the termination leads as shown, additional force augmentation is obtained to yield a factor of about four during the initial predetermined current limiting armature conductor acceleration. If the conductor orientation throughout the resistive bore section remains as shown in FIG. 2, then the accelerating force on the armature conductors, if they are precisely above each other, will be about twice the accelerating force experienced by the armature conductor in the modular limiter of FIG. 1. If one armature conductor gets slightly ahead, its accelerating force drops by a factor of two thus causing the rearward armature conductor to catch up and the armature conductors can thus be expected to remain reasonably abreast. Actually, an augmentation factor of two in the portion of the bore which is lined by the resistive rail segments may cause excessive velocity and therefore complicate the stopping of the armature conductors in their extreme resistive bore positions. To reduce acceleration and hence velocity in the resistive bore section, the individual bore fluxes can be uncoupled from each other by the insertion of a ferromagnetic flux isolator 48 as shown in FIG. 3. This flux isolator reduces the slider accelator force by eliminating flux augmentation in the resistive bore portion. Alternatively, the distance between the two bores can be increased in the resistive bore portion to reduce augmentation.

Figure 4:
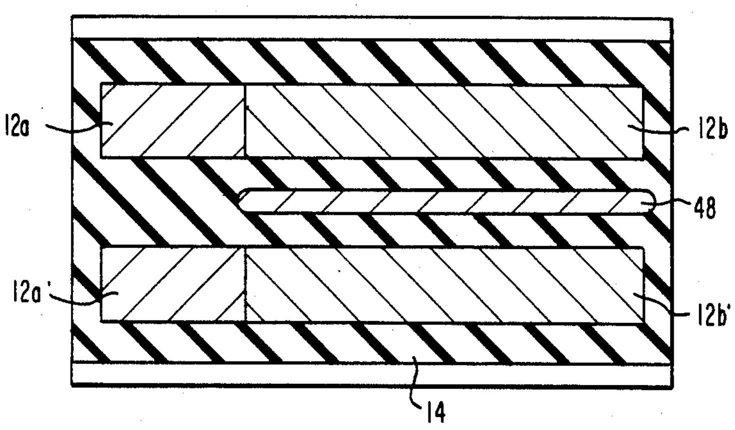
FIG. 4 is a longitudinal cross section of the current limiter of FIG. 3 taken along line IV—IV.

FIG. 4 is a cross sectional view of FIG. 3 taken along line IV—IV. In FIG. 4, the flux isolator 48 is shown to extend only between the resistive rail segments of the adjacent bores. By using this configuration, armature accelerating force is increased in the high conductivity rail sections where it is needed for initial armature conductor acceleration and the augmentation is essentially eliminated where it is no longer needed or desired, that is in the resistive bore portion.

Figure 5:
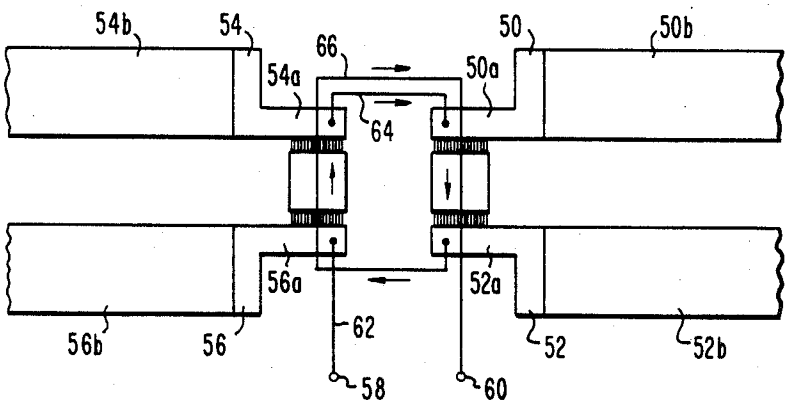
FIG. 5 is a plan view of the rail assembly of an alternative embodiment of this invention.

An alternative current limiting apparatus is shown in FIG. 5 wherein a first pair of conductive rails 50 and 52 each having a high conductivity section **50*a* and 52*a* and a resistive section 50*b* and 52*b* are shown to be positioned in axial alignment with a second pair of conductive rails 54 and 56 each having a high conductivity section 54*a* and 56*a* and a resistive section 54*b* and 56*b*. These pairs of rails are electrically connected in series between a pair of terminals 58 and 60 by way of conductors 62, 64 and 66. These conductors, in combination with the rails, can be seen to provide a multiple turn coil which generates a high flux density, but which acts only in the initial armature conductor acceleration length to provide whatever augmentation is required by simply adding additional conductor turns. If the number of turns is limited as shown in FIG. 5, then the turns should be split into two parallel paths located on opposite sides of the rails. If there are additional augmenting turns, they should again be symmetrically located on opposite sides of the rails. The FIG. 5** configuration of course reduces the augmentation to unity once the armature conductors are well outside the termination coil.

Figure 6:
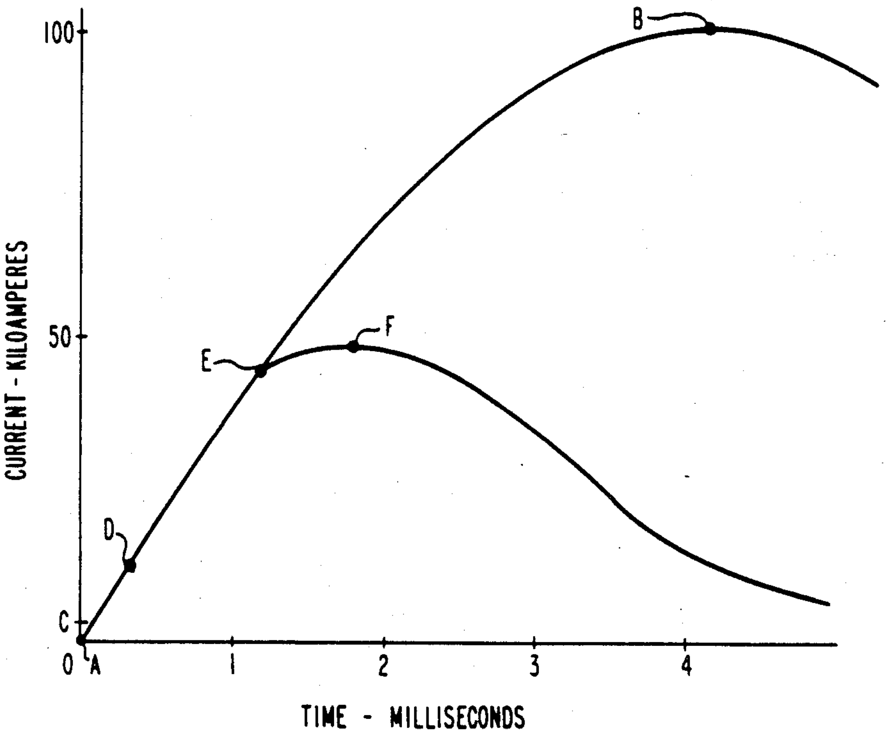
FIG. 6 is a graph which illustrates the operation of the present invention.

FIG. 6 shows a calculated current curve which illustrates a typical current limiting performance of the present invention. For simplicity of explanation, it is assumed that the short circuit condition was initiated at point A and that in the absence of current limiting, the 60 Hz. current would attain a peak magnitude of 100 kiloamps at point B. The operating current level is assumed to be 3000 amperes peak as indicated at point C. The sliding armature conductor 20 as shown in FIG. 1 is held and restrained in its normal high conductivity rail position by spring 32 and stop 34. At normal operating currents, the armature acceleration forces are deliberately far too low to cause any armature movement. Alternatively, the system may be designed to allow for some slight armature vibration which may assist in maintaining low contact resistance between the armature and the rails. The restraints on armature movement are deliberately set so that at some particular threshold current level, for example, at a level of 12,000 amperes as indicated by point D, the acceleration forces will exceed the restraining forces and the armature acceleration then commences. It should be observed that armature acceleration is proportional to current squared and therefore if the threshold current is four times the operating current peak value as in this example, then the threshold accelerating force will be sixteen times the peak force which is experienced by the armature during rated current operation. Thus, at rated current conditions, the force on the armature is quite small compared to the force which will commence armature movement under a fault condition. In this mode of operation, a circuit breaker connected in series with the current limiter, is expected to always interrupt moderate fault currents after a few or many cycles of fault current duration. For massive fault current conditions wherein the fault current rises above the threshold current level of the current limiter, the current limiter very rapidly reduces the current level and the circuit breaker thus only interrupts a few cycles later at a moderate current level.

In the massive fault scenario of FIG. 6, absent current limiting, the fault current would attain, for example, 100 kiloamps and a breaker would then have to interrupt this current a few cycles later after substantial arc damage associated with arcing at such high current levels. With current limiting, the armature conductor will commence movement at its threshold current level, point D, and in the order of a millisecond later at point E, the total armature conductor will be in resistive rail sections since the rear conducting portion or face of the armature conductor will just have passed beyond the high conductivity rail sections, and current limiting will start. Depending upon the initial rail resistance per unit length and the armature velocity, the peak current will now be limited to a magnitude such as that illustrated at point F and thereafter, as armature motion adds rail resistance, the fault current will rapidly decrease to the point where the armature has reached its maximum travel distance. If the armature is temporarily restrained at this maximum distance and maximum resistance position, the fault current level will be reduced as desired, for example, to a few kiloamperes, and a few cycles later, this fault current must absolutely be interrupted by the breaker since otherwise, overheating of the resistive rail portions of the current limiter would occur.

In the above scenario, the breaker and its instrumentation which senses fault conditions will have been subjected to a single moderate current excursion, that is, to the peak current value illustrated by point F. After reaching this peak value, the fault current may have been reduced by current limiting all the way to near rated operating current level. This brief current excursion with normal breaker instrumentation may not be enough to assure that breaker opening is initiated. Therefore, a voltage sensor in the form of a relay coil or other instrumentation may be connected across the current limiter terminals in order to sense voltage across the current limiter. Very soon after the sliding armature conductor fully enters the resistive rail portion, near to full system voltage will appear across the current limiter and the voltage sensing instrumentation or the relay must signal the breaker to initiate current interruption. Actual breaker contact opening will then occur a few cycles later, at a very moderate current level and hence with little contact erosion. Actually, current interruption could at this point be accomplished with a contactor rather than a breaker.

The curves of FIG. 6 can also be used to better explain why it is desirable to increase the initial sliding armature conductor acceleration force. The sliding armature conductor must have sufficient cross-sectional area and mass so as not to overheat at rated current conditions. Actually, rated operating current conditions and the associated temperature rise will determine the armature mass since the additional armature temperature rise during current limiting will be quite small because there is only a single short duration high current peak. Examining FIG. 1, it can be seen that current limiting essentially starts only after the sliding armature has travelled a distance approximately equal to its own length and has thereby fully entered the resistive rail bore portion. A higher initial accelerating force will result in a faster armature traverse, thereby lowering the fault current value at point E in FIG. 6. The peak let through fault current at point F will also be lowered. Therefore, the armature should traverse its own length as fast as possible. However, once current limiting has started at point E with the armature now travelling at, for example, 50 meters per second, there is little advantage in further acceleration as this will only make stopping the armature more difficult. Therefore, the most favorable acceleration augmentation schemes only augment the acceleration force for the initial few centimeters of bore length.

In FIG. 1, the sliding armature is shown in its normal operating position wherein the armature is shown to short across the high conductivity portions of the current limiter rails. The high conductivity rail sections will generally be copper and may be partially silver plated to further lower and maintain low contact resistance at the location of the armature electrical contact areas. Thus, at normal operating conditions, a high conductivity armature which may include numerous high conductivity metal fibers, brushes or liquid metal, shorts between the high conductivity rail sections such that the total resistance between these sections consists of only two contact resistances on opposite ends of the armature plus the electrical resistance of the armature itself. Calculations have shown that for operating currents of about 2500 amperes rms, the resistance between the high conductivity rails and a metal fiber or liquid metal armature would be in the order of 10 microhms. Such a minimal resistance is highly favorble to reduce contact heat losses. Actually, this contact impedance is about the same as for circuit breaker contacts designed for the same operating current levels.

In FIG. 6, the current limiting apparatus performance was illustrated with respect to one phase of a 60 Hz. system. In a three-phase AC system, a current limiting apparatus would be series connected into each of the three phases. FIG. 6 illustrates that for most effective alternating current operation, current limiting must be initiated very rapidly after fault inception, for example, in about 1 millisecond, so that fault current is limited to a magnitude well below the prospective peak value which would occur absent the current limiter. An alternative approach is to have a slower acting current limiter in which case, the first fault current peak may actually occur but current limiting will prevent successive peak currents of high magnitude. In this case, the circuitry will be subjected to one massive fault current excursion, but by the time the breaker operates, current will be low enough to reduce breaker contact deterioration. One disadvantage of this slower current limiter action is that system components will be subjected to a single pulse of very high electromagnetic forces associated with fault currents which may be in the 100 kiloampere range.

As shown in FIG. 6 for 60 Hz. alternating current system, computer solutions indicate that current limiting can readily be initiated in the order of a millisecond after fault initiation. In a direct current system, the initial rate of rise of fault current can be expected to be comparable or more likely slower than that indicated in FIG. 6. Under DC conditions, the current limiter will similarly reduce the prospective peak current level which would be generated absent the current limiter. Thereafter, an additional circuit series resistance increase as the armature traverses the resistive rail bore will again produce further current reduction. Thus, the current limiters of this invention are equally applicable to alternating and direct current systems to prevent excessive fault current magnitudes.

The current limiting apparatus of this invention can be seen to be particularly suited for the series connectin of modular parallel rail limiting units for higher voltage applications. Particular rail geometries improve electromagnetic force augmenting to increase initial armature conductor acceleration thereby resulting in earlier current limiting and lower let-through current levels. Threshold current adjustment can be easily accomplished by adjusting the initial armature conductor position or by providing a clutch release assembly. Spring assisted initial acceleration can also be provided.

It should be observed that pairs of current limiters as illustrated in FIGS. 2, 3 and 5 may also employ parallel rather than series electrical connection of the two rail pairs. A parallel electrical connection would be of use primarily for very high steady state current applications, since the threshold current, point D in FIG. 6, would be doubled. For two resistive rail bores which are electrically in parallel, armature conductor acceleration and travel will be self-compensating in that if one armature conductor accelerates more, the resistive path in its wake will lengthen. This would add resistance which will decrease the accelerating current and thus slows down the armature conductor.

It should be further observed that the electromagnetic forces which propel a conducting armature located between a parallel rail pair which is straight and unbending, also exist if the rail pair involves curvature. All that is necessary is that the propellable armature must be suitably restrained so that in its tranverse, it remains between the rails and continues to provide an electrical connection between the rails. Furthermore, even though all illustrations show two opposing resistive rail portions, it should be understood that the current limiter is also operable with one resistive rail and one rail which is highly conductive over the entire length of propellable armature traverse. Such a configuration, though operable, is considered to be inferior since for a given propellable armature traverse, the voltage gradient in the resistive rail will be doubled and all heat absorption will be concentrated in the one resistive rail.

Although the present invention has been described in terms of what are at present believed to be its preferred embodiments, it will be apparent to those skilled in the art that various changes may be made without departing from the scope of the invention. It is therefore intended that the appended claims cover such changes.

What is claimed is:

1. A current limiting apparatus comprising:

a first pair of conductive rails;

a first propellable armature conductor slidably disposed between said first pair of conductive rails;

a second pair of conductive rails;

a second propellable armature conductor slidably disposed between said second pair of conductive rails;

means electrically connecting said first and second pairs of rails with each other, wherein current flow in each pair of conductive rails augments the accelerating force on the propellable armature conductor between the other pair of conductive rails; and means connecting said rails to an external circuit such that under fault current conditions, each armature conductor is electromagnetically propelled by the fault current into a bore lined by a resistive portion of at least one of said rails, thereby adding circuit impedance to limit the fault current magnitude.

2. A current limiting apparatus as recited in claim 1, wherein said first and second pairs of rails are electrically connected in series with each other.

3. A current limiting apparatus as recited in claim 1, wherein said first and second pairs of rails are electrically connected in parallel with each other.

4. A current limiting apparatus as recited in claim 1, wherein said conductive rails each include a highly conductive section and under normal operating conditions, said armature conductors are positioned to short between the highly conductive sections of the associated pair of said rails.

5. A current limiting apparatus as recited in claim 4, wherein the acceleration force augmentation primarily occurs between said highly conductive sections of said rails.

6. A current limiting apparatus as recited in claim 1, further comprising:

a flux isolator positioned between the resistive portions of said first pair of rails and the resistive portions of said second pair of rails to reduce or eliminate acceleration force augmentation in the resistive portions of said rails.

7. A current limiting apparatus as recited in claim 1, wherein said conductive rails are parallel to each other.

8. A current limiting apparatus as recited in claim 1, further comprising an insulating support member for holding said conductive rails in a fixed position.

9. A current limiting apparatus as recited in claim 1 wherein under normal operating conditions, said armature conductors are subjected to electromagnetic forces which are insufficient to initiate armature movement.

10. A current limiting apparatus as recited in claim 1, further comprising:

means restraining said armature conductors in their normal operating position.

11. A current limiting apparatus as recited in claim 10, wherein when the fault current exceeds a preselected threshold current level, electromagnetic armature conductor acceleration forces exceed restraining forces applied by said armature restraining means and armature acceleration commences.

12. A current limiting apparatus as recited in claim 11, further comprising:

means for mechanically aiding initial armature conductor acceleration when said electromagnetic armature conductor acceleration forces exceed said restraining forces.

13. A current limiting apparatus as recited in claim 11, further comprising:

means for adjusting the normal operating positions of said armature conductors, thereby adjusting the magnitude of said threshold current level.

14. A current limiting apparatus as recited in claim 1, wherein when under fault current conditions the current exceeds a preselected threshold level, armature conductor acceleration is directly produced.

15. A current limiting apparatus as recited in claim 1, further comprising:

means for limiting the distance traveled by said armature conductors and maintaining electrical contact between each of said armature conductors and the associated pair of said rails for the duration of current flow.

16. A current limiting apparatus as recited in claim 1, wherein each of said armature conductors comprises:

a plurality of conductive metal fibers contacting the associated pair of said rails.

17. A current limiting apparatus as recited in calim 1, further comprising:

means for resetting said armature conductors to their normal position following a current limiting operation.

18. A current limiting apparatus comprising:

a first pair of conductive rails;

a first propellable armature conductor slidably disposed between said first pair of conductive rails;

a second pair of conductive rails;

a second propellable armature conductor slidably disposed between said second pair of conductive rails;

means electrically connecting said first and second pairs of rails with each other, wherein current flow in said rails and said armature conductors produces electromagnetic forces which accelerate said armature conductors;

means augmenting the initial armature conductor accelerating forces; and means connecting said rails to an external circuit such that under fault current conditions, each armature conductor is electromagnetically propelled by the fault current into a bore lined by a resistive portion of at least one of said rails, thereby adding circuit impedance to limit the fault current magnitude.

19. A current limiting apparatus as recited in claim 18, wherein said first and second pairs of rails are electrically connected in series with each other.

20. A current limiting apparatus as recited in claim 18, wherein said first and second pairs of rails are electrically connected in parallel with each other.

21. A current limiting apparatus as recited in claim 18, wherein said conductive rails each include a highly conductive section and under normal operating conditions, said armature conductors are positioned to short between the highly conductive sections of the associated pair of said rails.

22. A current limiting apparatus as recited in claim 21, wherein the acceleration force augmentation primarily occurs between said highly conductive sections of said rails.

23. A current limiting apparatus as recited in claim 21, wherein said additional conductors form a multiple turn coil positioned adjacent to the highly conductive sections of said rails.

24. A current limiting apparatus as recited in claim 18, wherein said means augmenting the initial armature conductor accelerating forces comprises:

additional conductors connecting said first and second pairs of rails in series and being positioned to increase the magnetic flux density behind each of the propellable armature conductors wherein current flows through said additional conductors.

25. A current limiting apparatus as recited in claim 18, further comprising an insulating support member for holding said conductive rails in a fixed position.

26. A current limiting apparatus as recited in claim 18, wherein under normal operating conditions, said armature conductors are subjected to electromagnetic forces which are insufficient to initiate armature movement.

27. A current limiting apparatus as recited in claim 18, further comprising:

means restraining said armature conductors in their normal operating position.

28. A current limiting apparatus as recited in claim 27, wherein when the fault current exceeds a preselected threshold current level, electromagnetic armature conductor acceleration forces exceed restraining forces applied by said armature restraining means and armature acceleration commences.

29. A current limiting apparatus as recited in claim 28, further comprising:

means for mechanically aiding initial armature conductor acceleration when said electromagnetic armature conductor acceleration forces exceed said restraining forces.

30. A current limiting apparatus as recited in claim 18, wherein when under fault current conditions the current exceeds a preselected threshold level, armature conductor acceleration is directly produced.

31. A current limiting apparatus as recited in claim 18, further comprising:

means for limiting the distance traveled by said armature conductors and maintaining electrical contact between each of said armature conductors and the associated pair of said rails for the duration of current flow.

32. A current limiting apparatus as recited in claim 18, wherein each of said armature conductors comprises:

a plurality of conductive metal fibers contacting the associated pair of said rails.

33. A current limiting apparatus as recited in claim 18, further comprising:

means for resetting said armature conductors to their normal position following a current limiting operation.

* * * * *